Nov. 10, 1970     A. H. NELSON     3,538,661
LIQUID STORAGE CONTAINER
Filed Oct. 4, 1968     3 Sheets-Sheet 1
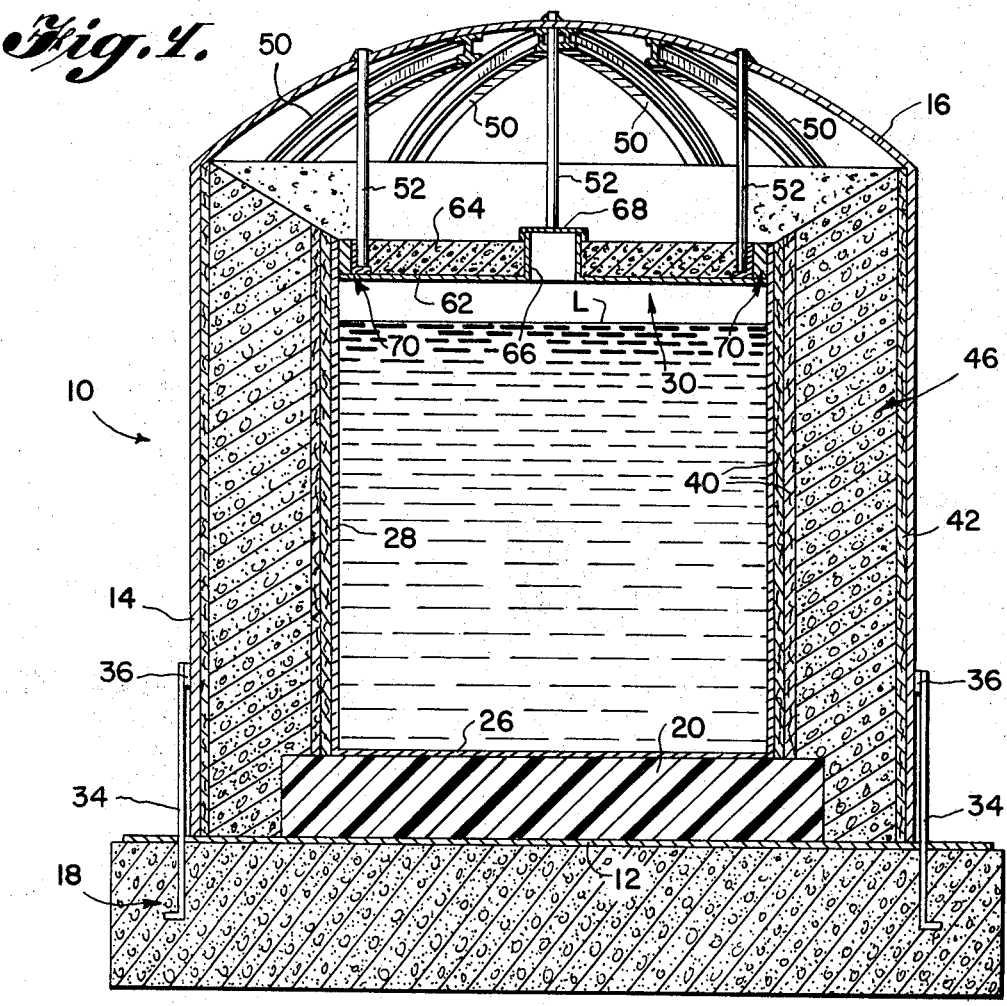
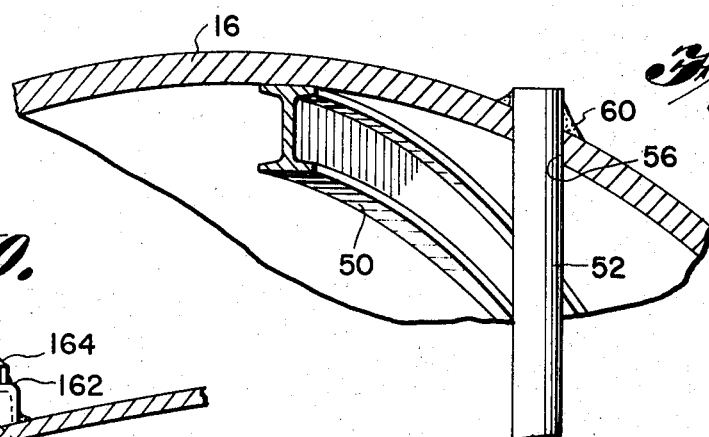
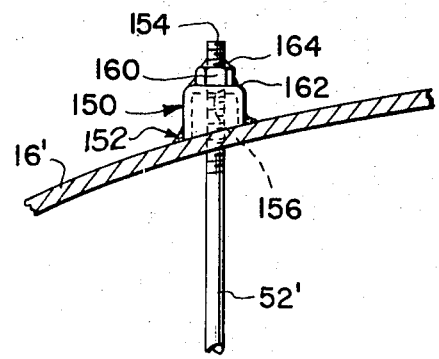
INVENTOR
ARDELL H. NELSON
BY Shoemaker and Mattare
ATTORNEYS Nov. 10, 1970    A. H. NELSON    3,538,661
LIQUID STORAGE CONTAINER
Filed Oct. 4, 1968    3 Sheets-Sheet 2
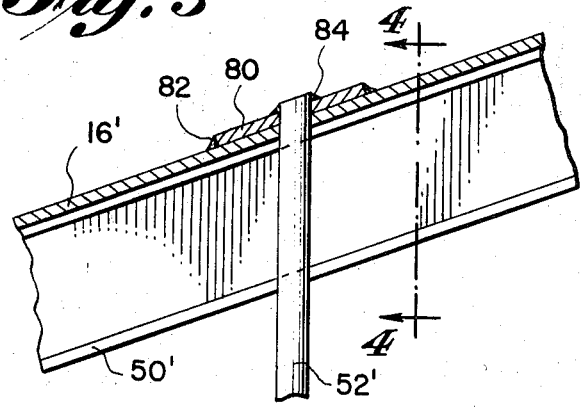
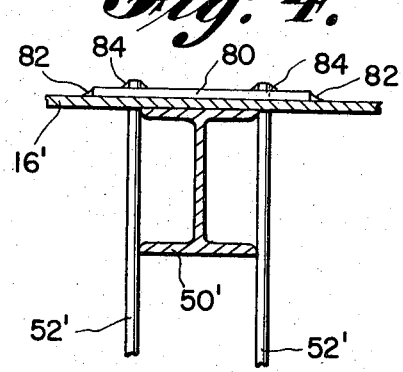
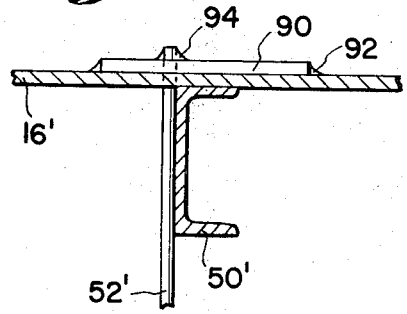
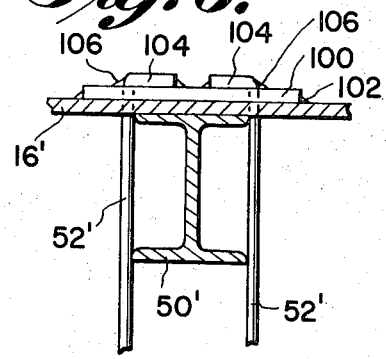
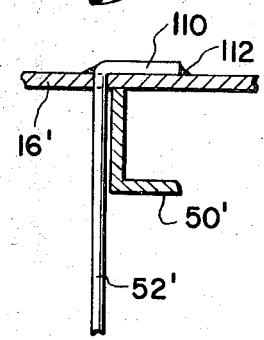
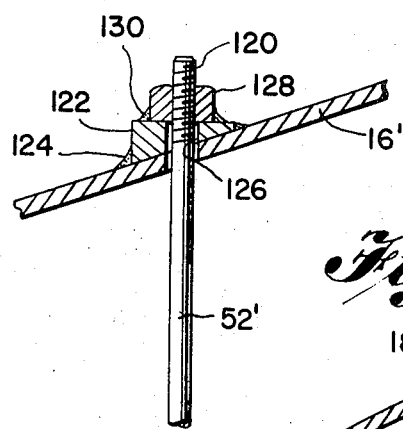
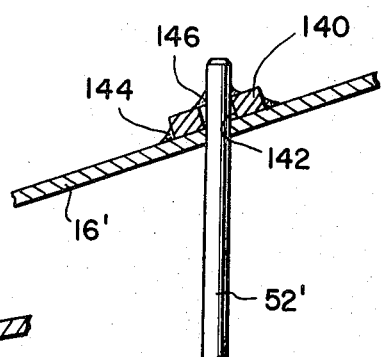
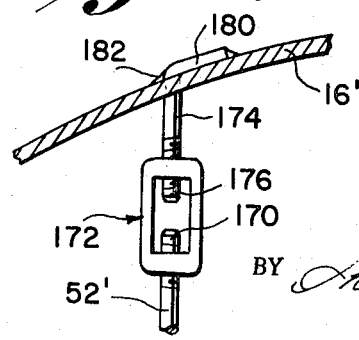
INVENTOR
ARDELL H. NELSON
BY *Shoemaker and Mattare*
ATTORNEYS

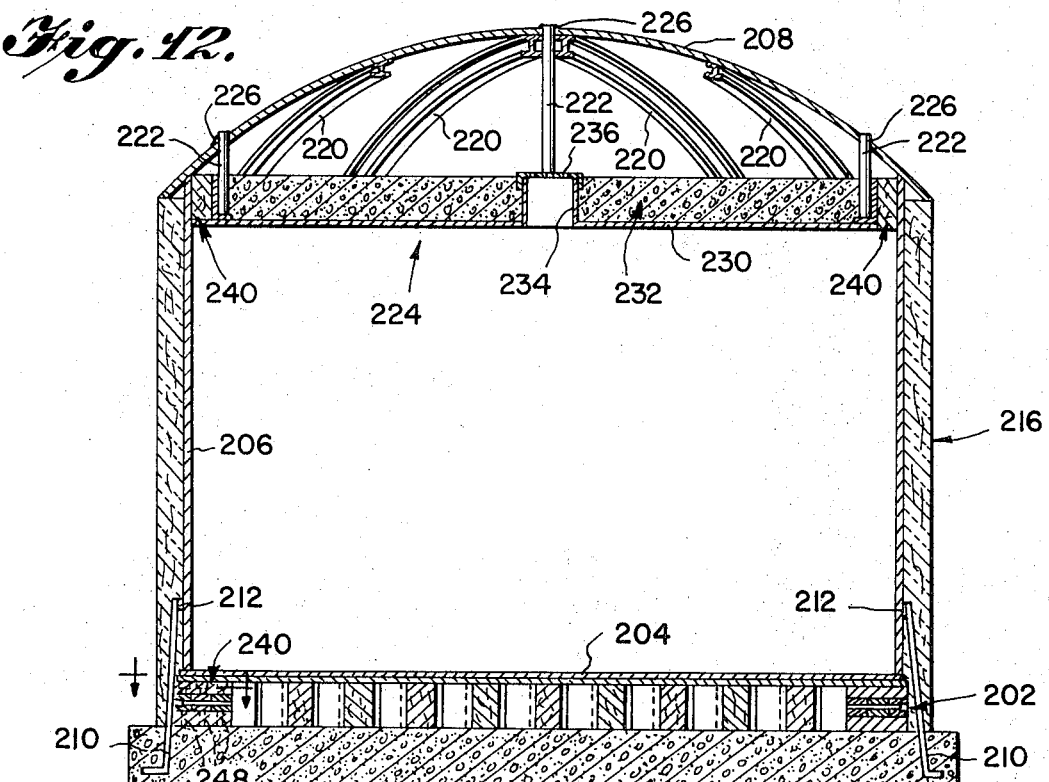
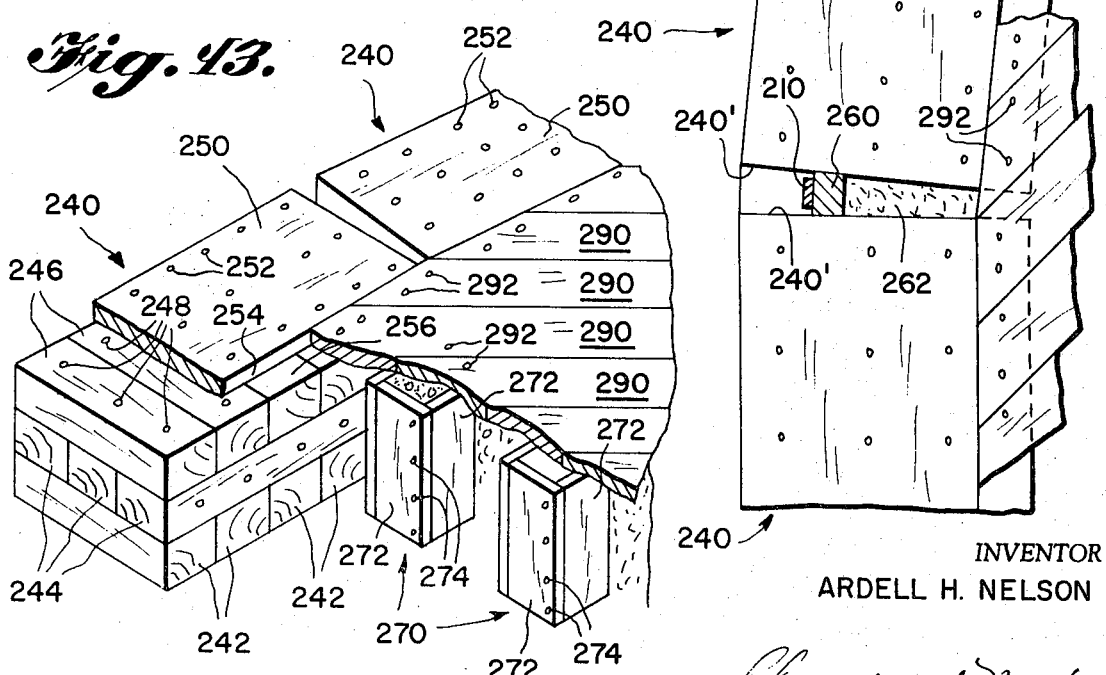

UNITED STATES PATENT OFFICE

3,538,661
Patented Nov. 10, 1970

3,538,661
LIQUID STORAGE CONTAINER
Ardell H. Nelson, Coraopolis, Pa., assignor to Pittsburgh-Des Moines Steel Company, Pittsburgh, Pa., a corporation of Pennsylvania
Filed Oct. 4, 1968, Ser. No. 765,269
Int. Cl. E04b 1/32; E04g 11/04
U.S. Cl. 52—246
22 Claims

ABSTRACT OF THE DISCLOSURE

A liquid storage container includes inner and outer vessels spaced from one another to define an insulating space therebetween. The side walls of the inner and outer vessels each have resilient blanket means disposed adjacent thereto and defining a space therebetween. The space between the resilient blanket means is filled with a mass of substantially free-flowing lightweight thermal insulating material. The roof of the inner vessel is suspended from the outer surface of the roof of the outer vessel. A modified form of the invention comprises a vessel having only one side wall and a body of insulation disposed in surrounding relationship to the side wall and held in place adjacent the outer surface thereof. A novel insulating foundation is also provided including a plurality of spaced modules having insulation disposed therebetween for supporting the vessel.

BACKGROUND OF THE INVENTION

The present invention relates to a liquid storage container which is especially adapted to store normally gaseous substances in a liquefied state at pressures near atmospheric pressure and temperatures near the boiling point of the liquid. It is well recognized that by storing gaseous substances such as hydrogen, oxygen, methane, ethylene and the like at low temperatures whereby the substances are in a liquid phase, the volume of the stored substance is greatly reduced so that large quantities of the substances can be stored in an economical manner.

The same general storage system could also be used for warm liquids as well as cold liquids since the problems caused by temperature differentials are similar in both instances. However, a refrigerated liquid storage system is generally referred to herein since it is more often utilized.

Since the liquid being stored is at a very low temperature, a heavily insulated tank must be provided. Conventional insulation materials are quite expensive, and a number of problems are encountered when using same. It is desirable to employ a relatively inexpensive substantially free-flowing lightweight thermal insulating material such as expanded perlite and the like in the insulating space provided between the inner and outer vessels of the usual double-walled tank employed in refrigerated storage applications.

A particular problem encountered with this type of insulating material is the fact that such a free-flowing type of material has a tendency to settle or move vertically downwardly within the insulating space between the side walls of the inner and outer vessels when the side walls move away from or relative to one another, or in other words when the inner vessel side wall contracts, or the outer vessel side wall expands, or a combination of these two movements.

On the other hand, when the side walls of the vessels move toward one another as when the inner vessel side wall expands or the outer vessel side wall contracts, the particles of the insulating material are compacted and crushed. As a result of this alternate compaction and crushing and downward settling due to relative movements of the side walls of the inner and outer vessels, the upper regions of the insulation space between the side walls of the two vessels may not be completely filled with insulation thereby resulting in excessive heat transfer through such voids.

Additionally, continued cyclic expansion and contraction of the associated side walls of the vessels results in increased lateral pressure of the insulating material due to the compaction and crushing of the particles of insulating material which may cause buckling or rupturing of the vessels.

The side wall of the inner vessel moves laterally in accordance with temperature changes within the vessel as caused by filling of the vessel with cold liquid or evacuation of the vessel with a subsequent return to atmospheric temperature. Additionally, the height of the stored liquid within the vessel causes temperature gradients within the vessel itself. In addition to thermally induced lateral movements of the side wall of the inner vessel, stress induced lateral movement also occur.

Temperatures on the side wall of the outer vessel may fluctuate as much as 150° F. during a single day, thereby causing substantial thermally induced lateral movements of the outer vessel wall. Movements of the side wall of the outer vessel can be very detrimental since these movements will occur daily with ambient temperature changes.

It is accordingly necessary to provide means for preventing settlement and load build-up of the free-flowing insulating material between the side walls of the vessels due to the lateral movements of both the inner and outer vessel side walls.

When settlement and compaction of the free-flowing insulating material between the side walls of the vessels is prevented by suitable means, there is little movement or settlement of any insulating material above this region since there is no place for this insulating material to shift to, and thus it remains where originally placed.

In many instances, it is desirable to suspend the roof of the inner vessel from the roof of the outer vessel. In the past, the roof of the inner vessel has been suspended from the inner surface of the roof of the outer vessel. The suspension of the roof of the inner vessel from the inner surface of the roof of the outer vessel is undesirable, and it is a particular objective of the present invention to avoid this arrangement.

SUMMARY OF THE INVENTION

In the present invention, resilient blanket means are disposed adjacent the outer surface of the side wall of the inner vessel as well as adjacent the inner surface of the side wall of the outer vessel. These resilient blanket means are spaced from one another, and a mass of substantially free-flowing lightweight thermal insulating material fills the space between the blanket means and exerts a lateral pressure against both of the blanket means.

Each of these resilient blanket means resists the active lateral pressure of the free-flowing insulating material disposed between the blanket means without substantial deflection of the blanket means. On the other hand, each of the blanket means is adapted to deflect or compress elastically without permanent set upon any increase in lateral pressures due to lateral movements of the adjacent side wall of one of the vessels resulting from stresses thereon or temperature changes. With a subsequent decrease in the lateral pressure due to lateral movements of the adjacent side wall of one of the vessels resulting from a change in stresses or temperature, the blanket means expands to its original position thus preventing any shift of the free-flowing insulating material.

Accordingly, when one of the side walls of the vessel expands or contracts, the resilient blanket means disposed adjacent thereto will contract or expand in a complementary manner so that the spacing between the resilient blanket means will remain substantially the same so as to prevent the mass of free-flowing material between the resilient blanket means from dropping downwardly within the insulating space or from being compacted and crushed.

The resilient blanket means and the free-flowing insulating material are placed in the insulating space between the inner and outer vessels when the storage tank is at ambient temperature, and the weight of the free-flowing material will cause the resilient blanket means to be slightly compressed. Accordingly, after several movements of the side walls of the vessels due to changes in stresses or temperature, an equilibrium position is reached by the resilient blanket means and thereafter only insignificant amounts of compaction and crushing take place.

The present invention incorporates an arrangement wherein the roof of the inner vessel is suspended from the roof of the outer vessel by tie bar or rod support means which are suspended from the outer surface of the roof of the outer vessel.

In a modified form of the invention, a vessel is provided having only one side wall and a body of insulation disposed in surrounding relationship to the side wall of the vessel and held in place adjacent the outer surface thereof. A novel insulating foundation is also provided including a plurality of spaced modules for supporting the vessel.

BRIEF DESCRIPTION OF THE DRAWINGS

FIG. 1 is a vertical section through a storage container according to the present invention;

FIG. 2 is an enlarged view of a portion of the structure shown in FIG. 1;

FIG. 3 is a view of a modified form of suspension means;

FIG. 4 is a sectional view taken substantially along line 4—4 of FIG. 3 looking in the direction of the arrows;

FIGS. 5, 6 and 7 are sectional views similar to FIG. 4 illustrating further embodiments of the invention;

FIG. 8 is a cross-section of still another form of the invention;

FIG. 9 is a cross-section through yet another form of the invention;

FIG. 10 is a cross-section through a further form of the invention;

FIG. 11 is a cross-section through another form of the invention;

FIG. 12 is a vertical section through a modified storage container;

FIG. 13 is a top perspective view partly broken away illustrating the arrangement of the modules and planking of the foundation for the vessel; and FIG. 14 is a sectional view on an enlarged scale taken substantially along line 14—14 of FIG. 12 looking in the direction of the arrows.

DESCRIPTION OF THE PREFERRED EMBODIMENTS

Referring now to the drawings wherein like reference characters designate corresponding parts throughout the several views, there is shown in FIG. 1 an outer vessel indicated generally by reference numeral 10 having a flat bottom 12, a substantially cylindrical side wall 14 and a roof 16. The bottom 12 rests upon a suitable foundation 18 formed of concrete and the like.

A body of load-bearing insulation 20 rests upon the bottom 12 of the outer vessel, this body of load-bearing insulation comprising for example, foam-glass and the like. An inner vessel includes a bottom 26, a substantially cylindrical side wall 28 and a roof indicated generally by reference numeral 30. The bottom 26 of the inner vessel rests upon the body 20 of load-bearing insulation.

A plurality of anchor straps 34 are secured as by welding to pads 36 rigidly affixed as by welding to the outer surface of the side wall 14 of the outer vessel. These anchor straps are embedded within the foundation 18 for rigidifying the structure.

The contained liquid is disposed within the inner vessel, the upper level of the liquid disposed within the vessel being indicated by reference character L. It should be understood that suitable means is provided for introducing liquid and gas into and discharging liquid and gas from the inner vessel including nozzles, valves, pipes and the like which are of conventional construction and which have not been shown for simplicity of illustration.

The outer vessel which serves primarily as an insulation protector and vapor barrier and for withstanding the lateral forces of the insulating material between the inner and outer vessels may be formed of metal such as mild steel, or other materials suitable for this purpose. The inner vessel which is designed to contain the liquefied gas and to withstand the lateral pressure of the insulating material between the two vessels may be formed of metal such as aluminum, or other materials suitable for this purpose and having the necessary properties over the temperature ranges to which it is subjected.

A first resilient blanket means includes one or more adjacent layers of resilient material 40 disposed in surrounding relationship to the outer surface of the side wall 28 of the inner vessel. A second resilient blanket means includes one or more adjacent layers of resilient material 42 disposed adjacent to the inner surface of the side wall of the outer vessel and is disposed in opposed facing relationship to the first-mentioned blanket means and is substantially coextensive therewith. The two resilient blanket means are disposed in contact or close proximity with the associated side walls of the inner and outer vessels respectively and the blanket means define a space therebetween. The resilient blanket means are retained in operative position until installation of the free-flowing insulating material by adhesive or suitable fasteners (not shown) affixed to or extending from the adjacent side walls of the associated vessel. After the substantially free-flowing insulating material has been installed, the resilient blanket means are secured permanently in their operative position by the lateral pressure of the substantially free-flowing insulation.

It will be noted that the thickness of the blanket means adjacent the side wall of the inner vessel is substantially greater than the thickness of the blanket means disposed adjacent the side wall of the outer vessel. In the illustrated embodiment, the first-mentioned blanket means is two or more times thicker than the thickness of the second-mentioned blanket means. This is due to the fact that with the inner vessel at a much lower temperature than the outer vessel, the respective movements are greater. However, the more frequent daily ambient movement of the outer vessel wall can be more detrimental to settlement of the substantially free-flowing insulation material if the blanket means adjacent the outer vessel wall is not used.

The space between the two blanket means as well as the space between the spaced roofs 16 and 30 of the outer and inner tanks respectively is filled with a mass of substantially free-flowing lightweight thermal insulating material preferably of a granular nature 46. In a typical example, the free-flowing insulating material may comprise expanded perlite. This insulating material must have a particle size sufficiently small to limit convection losses by circulation of gases through the packed mass.

To avoid combustion problems as for example encountered in the storage of liquid oxygen, the free-flowing insulation material is preferably an inorganic substance such as expanded perlite, expanded vermiculite, inorganic serogels such as silica aerogel and the like. This free-flowing insulating material may also for example comprise granulated cork, shredded foamed polystyrene and the like. Other fibrous materials such as shredded wood or bark, fiberglass waste or mineral wool may be used. In any event, the insulating material should be non-cohesive or substantially free-flowing.

The resilient blanket means must resist lateral pressure of the free-flowing insulating material without substantial deflection but must deflect or compress elastically without permanent set when the associated side walls of the respective vessels move in a lateral direction. In other words, when the side wall of the inner vessel contracts, the blanket means 40 will expand, and on the other hand, when the side wall of the outer vessel contracts, the blanket means 42 will be compressed, whereas when the side wall of the outer vessel expands, blanket means 42 will also expand. In this manner, the annular space between the two resilient blanket means is maintained substantially constant.

The resilient blanket means must retain its resilient characteristics at extremely low temperatures, and a preferred blanket means comprises sheets of matted glass fibers, formed into a resilient mass and held in place by means of a suitable binder. For example, a low density resilient blanket means formed of fine glass fibers bonded together by a binder such as a thin film of phenol-formaldehyde resin binder is suitable. The nominal diameters of the glass fibers of the blanket means may be less than 0.0015 inch. This type of blanket means may have a density of approximately two pounds per cubic foot.

The thickness of the blanket means is sufficient so that it is adapted to expand and be compressed to the necessary degree to accommodate the movements of the associated side walls of the respective vessels.

The resilient blanket means may also be formed of other fibrous or suitable flexible materials, and for example the blanket means may be made of acetate synthetic fibers suitably bonded together.

The roof 16 of the outer vessel includes a plurality of substantially radially extending roof rafters 50 disposed at the undersurface thereof to rigidify the roof. A plurality of depending tie bar or rod support means 52 are provided for supporting the roof 30 of the inner vessel.

As seen most clearly in FIG. 2 of the drawings, each of the depending support means 52 extends through a suitable hole 56 provided through roof 16 of the outer vessel, the uppermost end of each of the support means 52 being interconnected with the outer surface of roof 16 by a weld 60 extending completely around the associated support means 52. This provides an effective seal between the roof 16 and each of the support means. In this manner, the roof of the inner vessel is suspended from the outer surface of the roof of the outer vessel.

The roof 30 of the inner vessel includes a plate 62 upon which is supported a suitable body of insulating material 64. This body of insulating material may comprise Fiberglas, rock wool, perlite, slabs of rigid polyurethane foam and the like. A central vent hole 66 is provided through plate 62 and the body of insulating material, this vent hole being covered by a plate 68 which is foraminous to allow the escape of gas therethrough into the space between the roof of the inner vessel and the outer vessel.

An annular seal means 70 is disposed between the outer periphery of roof 30 and the adjacent side wall 28 of the inner vessel. This annular seal means may comprise a band of Fiberglas under compression, the resilient characteristics of the Fiberglas insuring an effective seal at all times to prevent the roof insulation from entering into the interior of the tank.

Referring now to FIGS. 3 and 4 of the drawings, a modification is illustrated. The components of this form of the invention similar to that previously described have been given the same reference numerals primed. In this form of the invention, the support rod 52' extends upwards through aligned holes in the roof 16' and a pad plate 80. This pad plate 80 is in turn welded in place to the outer surface of roof 16' as indicated by reference numeral 82, the upper end of the support rod 52' being welded in place as indicated by reference numeral 84.

It will be noted as seen in FIG. 4 that the roof rafter 50' in this form of the invention is an I-beam, and that a pair of support rods 52' extend upwardly from the suspended roof at either side of the roof rafter.

Referring now to FIG. 5 of the drawings, a further modification is illustrated. In this case, the roof rafter 50' is of channel-shaped configuration, and a support rod 52' extends upwardly closely adjacent therethrough. The upper end of the support rod extends through aligned holes provided in roof 16' and pad plate 90. The pad plate 90 is secured in place by welding as indicated by reference numeral 92, and the upper end of the support rod is welded in place as indicated by reference numeral 94.

Considering now FIG. 6 of the drawings, still another form of the invention is illustrated. This modification is to that shown in FIG. 4, the principal difference being that the upper ends of the support rods 52' extend through a pad plate 100 and are bent over to provide laterally extending portions 104. The pad plate 100 is secured in place by welding as indicated by reference numeral 102, and the bent over upper portions 104 of the support rods are secured in position by welding as indicated by reference numeral 106.

FIG. 7 illustrates still another form of the invention. As seen in this figure, the roof rafter 50' is an angle member, and the support rod 52' extends upwardly closely adjacent to one side thereof. The upper end of the support rod is bent over to provide laterally extending portion 110, this laterally extending portion being secured to the outer surface of roof 16' by welding as indicated by reference numeral 112.

Referring now to FIG. 8, still another form of the invention is illustrated. This form of the invention is particularly adapted to provide an adjustable arrangement, the upper end 120 of the support rod 52' being threaded as indicated. A tapered block 122 of suitable size is secured in place by welding as indicated by reference numeral 124. A hole 126 is provided in the block, and the threaded upper end of the support rod extends through this hole and an aligned hole in roof 16'. A nut 128 is threaded on the upper threaded end of the support rod for adjusting the vertical position of the support rod and the associated roof whereupon the nut 128 is secured in the position illustrated by welding as indicated by reference numeral 130.

Referring now to FIG. 9, another form of adjustable arrangement is illustrated. In this form of the invention, a locking collar 140 is provided with a central hole 142 which is of greater diameter than the upper end of the support rod 52'. Accordingly, when the support collar 140 is disposed horizontally rather than in the inclined position illustrated, the relative position of the collar and the support rod can be readily adjusted. When the support rod is in the desired operative position, the support collar 140 is allowed to be canted into the operative position illustrated whereupon the downward pull of the support rod will tightly lock the support collar to the rod to hold it in the position illustrated.

The support collar 140 is rigidly secured to the outer surface of roof 16' by welding as indicated by reference numeral 144. The upper end of the support rod is in turn secured to the support collar by welding as indicated by reference numeral 146.

Referring now to FIG. 10, a further form of an adjustable arrangement is illustrated. In this form of the invention, a conventional pipe cap 150 is provided the lower part of this pipe cap being burned off so that it conforms to the configuration of the outer surface of the roof. The cap is secured in place by welding as indicated by reference numeral 152. The upper end 154 of the support rod 52' is threaded, this threaded end extending through a hole 156 formed in the upper end of the pipe cap. A nut 160 is threaded on this upper threaded end and is secured in place by welding as indicated by reference numerals 162 and 164. It is apparent that nut 160 enables the support rod to be vertically adjusted so as to adjust the associated roof.

Referring to FIG. 11, a further adjustable arrangement is shown. In this form of the invention, the support rod 52′ is threaded at the upper end thereof as indicated by reference numeral 170, this threaded end being threaded within one end of a turn buckle member 172. A further rod 174 has the lower threaded end 176 thereof threaded in the opposite end of the turn buckle member. The upper end of the rod extends through a suitable hole formed in the roof and the upper end 180 thereof is bent over to form a laterally extending portion which is secured to the outer surface of the roof by welding as indicated by reference numeral 182.

Referring now to FIGS. 12–14 inclusive, a modified form of the invention is illustrated. As seen in FIG. 12, a foundation 200 formed of concrete or the like is provided, and an insulating foundation indicated generally by reference numeral 202 rests upon the foundation, the details of this insulating foundation being hereinafter described. The vessel includes a bottom 204 resting on the insulating foundation, and a substantially cylindrical side wall 206 extends upwardly from the bottom and supports a roof 208 at the upper part of the tank. A plurality of anchor straps 210 are secured as by welding to pads 212 rigidly affixed as by welding to the outer surface of the side wall of the vessel. These anchor straps extend downwardly and are embedded within the foundation 200 for rigidifying the structure.

A body of insulation 216 is disposed in surrounding relationship to side wall 206 and is held in place adjacent the outer surface thereof. This body of insulation extends throughout the height of the side wall. Insulation 216 may be for example formed of urethane foam, styrafoam, or Fiberglas and the like suitably waterproofed on the outer surface thereof. The insulation may be for example in the form of blankets or blocks which can be held in place by bands of aluminum and the like extending around the vessel. Mastic may be utilized in order to build up several layers of insulation so as to provide a body of insulation of the desired thickness. In the case of urethane foam for example, the insulation may be sprayed onto the outer surface of the side wall of the vessel and bonded thereto.

In a manner similar to that shown in FIG. 1, the roof 208 includes a plurality of substantially radially extending roof rafters 220 disposed at the undersurface thereof to rigidify the roof. A plurality of depending tie bar or rod support means 222 are provided for supporting a ceiling indicated generally by reference numeral 224.

As in the previously described modification, each of the support means 222 extends through a suitable hole provided in the roof, the uppermost end of each of the support means being rigidly interconnected with the outer surface of the roof by a weld indicated by reference character 226 to provide an effective seal between the roof and each of the support means whereby the ceiling is suspended from the outer surface of the roof.

The ceiling 224 includes a plate 230 upon which is supported a suitable body of insulating material 232. This body of insulating material may comprise Fiberglas, rock wool, perlite, slabs of rigid polyurethane foam and the like. A central vent hole 234 is provided through plate 230 and the body of insulating material, this vent hole being covered by a plate 236 which is foraminous to allow the escape of gas therethrough.

An annular seal means 240 is disposed between the outer periphery of ceiling 224 and the adjacent side wall of the vessel. This annular seal means may comprise a band of Fiberglas under compression to provide an effective seal at all times to prevent the roof insulation from entering into the interior of the tank. It should be understood that the ceiling may be suspended from the outer surface of the roof in any of the arrangements as shown in FIGS. 3–11 inclusive if so desired.

The insulating foundation indicated generally by reference numeral 202 is similar to that shown in copending U.S. patent application Ser. No. 702,746, filed Feb. 2, 1968.

The insulating foundation 202 includes a first plurality of spaced shell support modules indicated generally by reference numeral 240, these shell support modules being disposed in an annular spaced array so as to be disposed substantially beneath the side wall 206 of the vessel.

Each of these shell support modules comprises a plurality of interconnected timbers or wooden members. While a specific arrangement of timbers is illustrated, it will be readily recognized that each of the shell support modules may be built up as desired utilizing a plurality of timbers to afford the desired size and strength.

As seen most clearly in FIG. 13, each of the shell support modules 240 includes a first plurality of timbers 242 disposed in edge-to-edge relationship with one another and extending substantially radially of the storage tank. A second plurality of timbers 244 are supported on the upper surface of the timbers 242, timbers 244 also being disposed in edge-to-edge relationship with one another and extending substantially tangentially with respect to the storage tank. Each of the shell support modules also includes a third layer of timbers 246 disposed in edge-to-edge relationship with one another and supported on timbers 244, the timbers 246 being disposed substantially parallel with the timbers 242. All of these various timbers 242, 244 and 246 are suitably fastened together by means of fasteners 248 extending through the timbers. These fasteners as illustrated comprise elongated nails, although it should be understood that any suitable fastener means such as bolts or the like may be employed for rigidly securing the timbers together to provide an integrated module.

Each of the modules also includes a wooden timber or flat member 250 secured to the upper surface thereof by a plurality of fasteners such as nails 252, it being noted that the edge 254 of member 250 as seen in FIG. 13 terminates short of the inner edge of the remainder of the module to define a radially inwardly positioned shoulder 256, these inner shoulders on the various modules serving to support the planking hereinafter described.

As seen particularly in FIG. 14, adjacent shell support modules 240 are disposed with respect to one another such that the facing ends 240′ thereof are spaced apart to define a wedge-shaped space therebetween. A body of Fiberglas or similar material 260 is stuffed or forced into this space so as to be positioned in the location illustrated in FIG. 14 so as to retain loose fill insulation 262 inwardly thereof, this loose fill insulation as described hereinafter completely filling the space between the various bottom support modules of the foundation. This insulation is also disposed within the hollow modules. The bodies of Fiberglas 260 extend vertically between the upper surface of foundation 200 and the undersurface of the bottom 204 of the vessel which rests upon the upper surface of members 250 of the shell support modules.

A plurality of bottom support modules indicated generally by reference numeral 270 are provided. A large number of these modules are provided in substantially equally spaced relationship beneath the bottom wall of the vessel. The size and spacing of these bottom support modules will of course vary in accordance with the size of the vessel and the load to be supported. It should be understood that the modules will be disposed throughout the area beneath the bottom wall of the vessel in substantially equally spaced relationship.

Referring now to FIG. 13, each of the bottom support modules 270 is formed of four substantially identical rectangularly shaped timbers 272 interconnected by suitable fasteners 274 such as spikes, bolts, nails and the like. It is apparent that each of the bottom support modules comprises a hollow construction adapted to receive loose fill therewithin.

Means for interconnecting the modules with one another comprises planking, this planking including a plurality of adjacent timbers 290 disposed in edge-to-edge relationship, these timbers being suitably secured to the respective modules by means of suitable fasteners such as spikes, bolts, nails, and the like 292. The outer peripheral edge portion of the over-all planking is supported on the radially inner shoulders 256 of the shell support modules previously described, while the joints between the various lengths of planking aligned with one another are designed to be disposed over one of the bottom support modules. The individual members 290 of the planking are supported on the upper ends of the bottom support modules.

The loose fill insulation 262 previously described is adapted to substantially fill the space between the bottom support modules 270 as well as the space within the hollow interiors thereof, this loose fill insulation extending between the upper surface of foundation 200 and the undersurface of the planking, and also extending between adjacent shell support modules as previously described in connection with FIG. 14.

The unique support arrangement shown in FIGS. 12–14 including the plurality of spaced modules having insulation disposed therebetween may also be employed with the tank structure shown in FIG. 1, wherein this novel modular support arrangement would replace the load bearing insulation 20.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

What is claimed is:

1. A liquid storage container comprising an inner closed vessel having a side wall and a roof, an outer vessel having a side wall and a roof, the side wall of said outer vessel being spaced outwardly of the side wall of said inner vessel to define an insulating space therebetween, first insulating means disposed within said insulating space, the roof of said outer vessel being spaced outwardly of the roof of said inner vessel, second insulating means disposed between the roof of said inner vessel and the roof of said outer vessel, a plurality of elongated support members connected to the roof of said inner vessel, the roof of said outer vessel having a plurality of holes formed therethrough each of which has one of said support members extending therethrough with the upper end of each of said support members projecting above the roof of said outer vessel, the projecting upper end of each of said support members being fixedly connected to and sealed with respect to the outer surface of the roof of said outer vessel whereby the roof of the inner vessel is supported by the outer surface of the roof of the outer vessel.

2. A container as defined in claim 1, wherein said support members are fixedly connected to the outer surface of said outer roof by a welded connection.

3. A container as defined in claim 1 including roof rafter means disposed adjacent the undersurface of the roof of said outer vessel, each of said support members being disposed adjacent a roof rafter means.

4. A container as defined in claim 1, wherein said vessel includes a bottom, said bottom being supported by a plurality of spaced wooden modules having loose fill insulation material disposed therebetween, and a plurality of wooden members interconnecting said modules with one another to unitize and rigidize the support means for the vessel.

5. A container as defined in claim 4, wherein said means interconnecting said modules with one another comprises a plurality of wooden members defining planking, certain of said modules being disposed substantially beneath the side wall of said container and defining radially inwardly facing shoulders thereon, the edges of said planking being supported on the inner shoulders of said last-mentioned modules.

6. A container as defined in claim 1, wherein the upper ends of each of said support members is connected with a turn buckle means.

7. A container as defined in claim 1, wherein said first insulating means includes a first resilient blanket means disposed adjacent to the outer surface of the side wall of said inner vessel, second resilient blanket means disposed adjacent the inner surface of the side wall of the outer vessel, said first and second resilient blanket means being spaced from one another, and a free-flowing thermal insulating material substantially filling the space between said blanket means and exerting a lateral pressure against both of said blanket means.

8. A container as defined in claim 7 wherein said vessel includes a bottom, said bottom being supported by a plurality of spaced wooden modules having loose fill insulation material disposed therebetween, and a plurality of wooden members interconnecting said modules with one another to unitize and rigidize the support means for the vessel.

9. A container as defined in claim 8, wherein said means interconnecting said modules with one another comprises a plurality of wooden members defining planking, certain of said modules being disposed substantially beneath the side wall of said container and defining radially inwardly facing shoulders thereon, the edges of said planking being supported on the inner shoulders of said last-mentioned modules.

10. A container as defined in claim 1, wherein the upper end of each of said support members is rigidly interconnected with a plate.

11. A container as defined in claim 6, wherein each of said plates is rigidly secured to the outer surface of the roof of said outer vessel.

12. A container as defined in claim 10, wherein a plurality of said support members are interconnected with each of said plates.

13. A container as defined in claim 6, wherein the upper end of at least one of said support members is bent over to provide a laterally extending portion.

14. A container as defined in claim 1, including means for adjusting the relative position of said support members with respect to said outer roof.

15. A container as defined in claim 10 wherein said means for adjusting the position of said support members includes nut means, the upper end of each of said support members being threaded, said nut means being threaded on said threaded end of said support members, and a plate disposed adjacent said nut means and rigidly connected thereto.

16. A container as defined in claim 10, wherein said means for adjusting the position of each of said support members includes a support collar having a hole formed therethrough receiving an associated support member and permitting initial relative movement therebetween into a desired operative position and being fixedly connected to the associated support member.

17. A container as defined in claim 10, wherein said means for adjusting the position of said support members includes nut means, the upper end of each of said support members being threaded, said nut means being threaded on said threaded end of said support means, and a pipe cap fixedly connected to said nut means and fixedly connected to the outer surface of said roof.

18. A liquid storage container comprising a vessel having only one side wall and a roof, first insulating means disposed in surrounding relationship to said side wall and held in place adjacent the outer surface of said side wall, a ceiling in said vessel disposed inwardly of and spaced from said roof, second insulating means disposed between said ceiling and said roof, a plurality of elongated support members connected to said ceiling, said roof having a plurality of holes formed therethrough each of which has one of said support members extending therethrough with the upper end of each of said support members projecting above said roof, the projecting upper end of each of said support members being fixedly connected to and sealed with respect to the outer surface of said roof whereby said ceiling is supported by the outer surface of said roof.

19. A container as defined in claim 18, wherein said support members are fixedly connected to the outer surface of said roof by a welded connection.

20. A container as defined in claim 18 including roof rafter means disposed adjacent the undersurface of the roof, each of said support members being disposed adjacent a roof rafter means.

21. A container as defined in claim 16, wherein said vessel includes a bottom, said bottom being supported by a plurality of spaced wooden modules having loose fill insulation material disposed therebetween, and a plurality of wooden members interconnecting said modules with one another to unitize and rigidize the support means for the vessel.

22. A container as defined in claim 21, wherein said means interconnecting said modules with one another comprises a plurality of wooden members defining planking, certain of said modules being disposed substantially beneath the side wall of said container and defining radially inwardly facing shoulders thereon, the edges of said planking being supported on the inner shoulders of said last-mentioned modules.

References Cited

UNITED STATES PATENTS

| | | | |
|---|---|---|---|
| 2,144,598 | 1/1939 | Brinckerhoff et al. | 110—99 |
| 2,256,673 | 9/1941 | Hansen. | |
| 2,520,883 | 8/1950 | Kornemann et al. | |
| 2,913,571 | 11/1959 | Smith | 52—484 |
| 3,204,939 | 9/1965 | Ipsen | 110—99 |
| 3,338,010 | 8/1967 | Waugh | 52—415 |
| 3,352,443 | 11/1967 | Sattelberg et al. | |
| 3,383,004 | 5/1968 | Closner. | |

FOREIGN PATENTS 1,109,255   4/1968   Great Britain.

FRANK L. ABBOTT, Primary Examiner

J. L. RIDGILL, JR., Assistant Examiner

U.S. Cl. X.R.

220—9; 52—249